(12) United States Patent
Noba

(10) Patent No.: US 7,808,732 B2
(45) Date of Patent: Oct. 5, 2010

(54) LIGHT SOURCE APPARATUS

(75) Inventor: Koya Noba, Tokorozawa (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 236 days.

(21) Appl. No.: 12/042,792

(22) Filed: Mar. 5, 2008

(65) Prior Publication Data

US 2008/0218886 A1  Sep. 11, 2008

(30) Foreign Application Priority Data

Mar. 5, 2007   (JP) ............................. 2007-054230

(51) Int. Cl.
  *G02B 5/04* (2006.01)
(52) U.S. Cl. .................................... 359/831
(58) Field of Classification Search ......... 359/454–457, 359/831–837
  See application file for complete search history.

(56) References Cited

U.S. PATENT DOCUMENTS

| | | | | |
|---|---|---|---|---|
| 4,315,671 | A * | 2/1982 | Bunch | 359/741 |
| 6,344,926 | B1 * | 2/2002 | Arimoto et al. | 359/443 |
| 2005/0041287 | A1 * | 2/2005 | Goto | 359/456 |
| 2007/0177263 | A1 * | 8/2007 | Ono | 359/457 |
| 2008/0151540 | A1 | 6/2008 | Noba | |
| 2008/0259244 | A1 | 10/2008 | Noba | |

FOREIGN PATENT DOCUMENTS

| | | |
|---|---|---|
| JP | 63-132215 A | 6/1988 |
| JP | 2002-244211 A | 8/2002 |
| JP | 2006-228710 A | 8/2006 |

OTHER PUBLICATIONS

Noba, U.S. Patent Application entitled "Light Source Apparatus", U.S. Appl. No. 11/963,529, filed Dec. 21, 2007.
USPTO Office Action for U.S. Appl. No. 11/963,529, filed Date Dec. 21, 2007, Office Action Date Sep. 30, 2009.

* cited by examiner

*Primary Examiner*—Euncha P Cherry
(74) *Attorney, Agent, or Firm*—Brinks Hofer Gilson & Lione

(57) ABSTRACT

A conventional light source apparatus that combines incident light from a plurality of light sources by using prism sheets has the problem that the beam aspect ratio of incident light is undesirably changed so that exiting light has an extremely elliptical beam profile. The present invention provides a light source apparatus emitting light of circular beam profile having the same beam aspect ratio as that of incident light. The apparatus includes a plurality of light sources K and a plurality of prism sheets PS1 and PS2 each having a plurality of fine prisms on one surface thereof. The other surface of each prism sheet is a plane surface. The prism sheets are arranged in first and second stages as first and second beam profile transforming units such that their respective prism rows extend perpendicular to each other. The light sources are disposed at the entrance surface side of the first beam profile transforming unit at a predetermined angle thereto.

9 Claims, 12 Drawing Sheets

LIGHT SOURCE APPARATUS

REFERENCE TO THE RELATED APPLICATIONS

This application claims priority under 35 U.S.C. §119 to Japanese Patent Application No. JP2007-054230 filed Mar. 5, 2007, the entire content of which is hereby incorporated by reference.

TECHNICAL FIELD

The present invention relates to a light source apparatus that combines or color-mixes together incident light from a plurality of light sources and emits the combined or color-mixed light. More particularly, the present invention relates to a light source apparatus designed to improve the deformation of the beam profile of exiting light caused by an optical system.

RELATED CONVENTIONAL ART

There have heretofore been display systems using color light sources, such as color projectors, projection type color television systems, and liquid crystal display systems using a backlight unit. One type of light source apparatus used in these systems, e.g. color projectors and projection type color television systems, employs a dichroic prism (for example, see Japanese Patent Application Publication No. 2002-244211). This type of light source apparatus suffers, however, from the disadvantages that because the dichroic prism is a costly member, the overall cost of the apparatus increases unfavorably. In addition, this type of light source apparatus essentially involves a large loss in light quantity. To solve these disadvantages, there has been proposed a light source apparatus that uses linear prisms to convert a plurality of beams of light into a single beam (for example, see Japanese Patent Application Publication No. Sho 63-132215).

The arrangements of the conventional light source apparatus will be explained below with reference to the accompanying drawings. FIGS. 10 and 11 show the arrangement of a color projector disclosed in Japanese Patent Application Publication No. Sho 63-132215. FIG. 10 is a schematic view showing the arrangement of the color projector. FIG. 11 is a fragmentary sectional view of a part of a linear prism sheet shown in FIG. 10. FIG. 11 shows a Y-Z plane. In FIG. 11, a linear prism sheet 50 has a top surface serving as an entrance surface having a multiplicity of prism rows and a bottom surface constituting a plane exit surface 51. The prisms of the linear prism sheet 50 have a regular triangular sectional shape. Let us consider that light P52 (shown by white arrows) and light P53 (shown by black arrows) are incident on two prism inclined surfaces 52 and 53, respectively, from two different directions that are each at an angle of 60 degrees from a Z axis. After passing through the entrance-side prism inclined surfaces, the light P52 and P53 are reflected respectively by the opposite-side prism inclined surfaces and exit through the bottom plane surface 51 in the same direction as combined exiting light P51.

That is, by appropriately designing the refractive index of the linear prism sheet 50, which is determined by the constituent material thereof, and the prism apex angle (tip angle), two light incident on the prism rows from two directions perpendicular thereto are each transmitted through and reflected by two prism inclined surfaces of each prism to exit in the same direction. Based on this principle, incident light from two different kinds of light sources can be combined together and emitted as single combined light. If the two different kinds of light sources emit different colors of light, two colors of light can be emitted as color-mixed light. If it is desired to combine light from three or more different kinds of light sources, combining of light is repeatedly by using a plurality of linear prism sheets 50 to obtain combined light.

FIG. 10 shows a light source apparatus that combines three colors of light, i.e. red (hereinafter referred to as "R"), green (hereinafter referred to as "G") and blue (hereinafter referred to as "B"), by using two linear prism sheets 50 structured as shown in FIG. 11. In the figure, linear prism sheets 50a and 50b have the same structure as that of the above-described linear prism sheet 50. Reference numerals in FIG. 10 are used to denote as follows: 57 is an R light source; 58 is a G light source; 59 is a B light source; and 61, 62 and 63 are relay lenses of the R, G and B light sources 57, 58 and 59.

The R light source 57 and the G light source 58 are arranged to face the entrance surface of the linear prism sheet 50a at a predetermined angle in different directions. R light and G light emitted from the R light source 57 and the G light source 58 are collimated into parallel rays through the respective relay lenses 61 and 62 before being incident on the entrance surface of the linear prism sheet 50a from mutually different oblique directions. The two incident light R and G are combined together by the linear prism sheet 50a and exit as single light from the exit surface of the linear prism sheet 50a in a direction perpendicular thereto. The combined light exiting the linear prism sheet 50a is incident on the entrance surface of the linear prism sheet 50b from an oblique direction, the linear prism sheet 50b being disposed at a predetermined angle to the linear prism sheet 50a.

B light emitted from the B light source 59 is collimated into parallel rays through the relay lens 63 before being incident on the entrance surface of the linear prism sheet 50b from an oblique direction different from the incidence direction of the single light synthesized from R and G light. As a result, the R and G combined single light and the B light are combined together by the linear prism sheet 50b and emitted as single light synthesized from R, G and B light from the exit surface of the linear prism sheet 50b in a direction perpendicular thereto.

However, the related conventional light source apparatus have the following problems. The light source apparatus using a dichroic prism, disclosed in Japanese Patent Application Publication No. 2002-244211, has an increased cost because the dichroic prism is a costly member. In addition, this type of light source apparatus essentially involves a large loss in light quantity.

The light source apparatus using a plurality of linear prisms, disclosed in Japanese Patent Application Publication No. Sho 63-132215, suffers from the problem of expanded deformation. That is, because a beam of light is made obliquely incident on each linear prism, the width of the beam when exiting the linear prism is expanded, resulting in a difference in beam width between incident light and exiting light. In addition, the aspect ratio of the beam changes undesirably. The amount of change in beam aspect ratio varies according to the angle of oblique incidence of light on the linear prism and increases with the increase in the number of times of oblique light incidence on the linear prisms.

The way in which the beam profile is expandedly deformed in the light source apparatus shown in FIG. 10 will be explained below with reference to FIGS. 12 to 14.

FIG. 12 is a side view showing the expansion of a beam when light is incident on the entrance surface of a linear prism sheet. FIG. 12 shows a state where light P57 emitted from the R light source 57 is incident on the linear prism sheet 50a shown in FIG. 10. Let us consider a case where light P57 having a beam width H from the R light source 57 is incident on the entrance surface of the linear prism sheet 50a from a direction (Y direction) perpendicular to the prism rows. In this case, because a light beam having a certain width is made incident on a horizontal plane from an oblique direction, the width of the beam expands on the plane of incidence. Consequently, the incident light P57 exits as a beam having a width of 2H. It should be noted that the expansion of the beam width varies according to the angle of oblique incidence of the beam and increases as the angle $\theta_h$ from the entrance-side plane of the linear prism sheet 50a decreases, as has been stated above.

FIG. 13 is a plan view showing beam profiles expandedly deformed in FIG. 12. Part (a) of FIG. 13 shows light P57 from the R light source 57 that is a circular beam having a beam width H in both the X and Y axis directions. Part (b) of FIG. 13 shows the light P57 expandedly deformed in the Y axis direction by the linear prism sheet 50a. That is, the light P57 is deformed into an elliptical beam having a width 2H in the Y axis direction. Part (c) of FIG. 13 shows a beam profile obtained when light exiting the linear prism sheet 50a is incident on the linear prism sheet 50b as shown in FIG. 10. As shown in part (c) of FIG. 13, the light from the linear prism sheet 50a is further expanded double in beam width in the Y axis direction, resulting in an elliptical beam having a width 4H. Thus, the expansion of the beam width occurs in the same direction: the beam expansion from part (a) to (b) of FIG. 13 is in the Y axis direction $D_y$; and the expansion from part (b) to part (c) of FIG. 13 is also in the Y axis direction $D_y$. Therefore, the amount of change in beam aspect ratio between incident light and exiting light is multiplied. Consequently, the incident light, which has a circular beam profile, becomes exiting light having an extremely elliptical beam profile.

FIG. 14 schematically shows an optical path along which light P57 from the R light source 57 travels passing successively through the two linear prism sheets 50a and 50b shown in FIG. 10. FIG. 14 shows the way in which the beam profile is expandedly deformed by the linear prism sheets 50a and 50b. That is, in the related conventional art, the two linear prism sheets 50a and 50b are, as shown in FIG. 10, arranged so that their respective prism rows extend in the same direction parallel to the X axis. With this arrangement of the linear prism sheets 50a and 50b, the beam width is expanded in a direction perpendicular to the prism rows, as has been stated above in connection with FIGS. 12 and 13.

Let us explain the way in which light P57 emitted from the R light source 57 shown in FIG. 14 is expandedly deformed by the two linear prism sheets 50a and 50b according to the above-described conditions. Let us consider that light P57 emitted from the R light source 57 has a circular beam profile of $L_x$-$L_y$, where the beam width $L_x$ in the X axis direction and the beam width $L_y$ in the Y axis direction are equal to each other. First, when the light P57 is incident on the first-stage linear prism sheet 50a, the beam width in the X axis direction parallel to the prism rows remains at $L_x$, whereas the beam width in the Y axis direction perpendicular to the prism rows is expanded to $2L_y$. Consequently, light exiting the linear prism sheet 50a has an elliptical beam profile of $L_x$-$2L_y$. Next, when the light of elliptical beam profile exiting the linear prism sheet 50a is incident directly on the second-stage linear prism sheet 50b, the beam width in the X axis direction parallel to the prism rows remains at $L_x$, whereas the beam width in the Y axis direction perpendicular to the prism rows is expanded to $4L_y$. Accordingly, light exiting the linear prism sheet 50b has an elliptical beam profile of $L_x$-$4L_y$. Light emitted from the G light source 58 is also expandedly deformed through an optical path as shown in FIG. 14, although not shown in the figure. It should be noted that the expanded deformation of the beam profile is the same as that of the beam profile explained above in connection with FIG. 13.

As has been stated above, the conventional technique of combining light from a plurality of light sources through two linear prism sheets arranged so that their respective prism rows extend parallel to each other has the problem that the expanded deformation multiplies because the directions of expansion of the beam by the linear prism sheets are the same. This problem may be solved by a method wherein the range of use of the expandedly deformed exiting light is limited so that only the central part of the light is used, or a method wherein an aspherical lens is provided in the light-combining optical path to change the beam profile. With the former method, however, only a part of the exiting light can be used. Therefore, the light utilization efficiency is degraded, so that bright illumination cannot be obtained. The latter method needs to provide an extra member such as an aspherical lens, which is disadvantageous from the viewpoint of the size and cost of the light source apparatus.

SUMMARY OF THE INVENTION

The present invention has been made in view of the above-described problems with the related conventional art. Accordingly, an object of the present invention is to provide a light source apparatus made less costly and capable of being reduced in size and thickness and increased in the light utilization efficiency by devising the arrangement of two prism sheets used to combine light from a plurality of light sources so that there is no change in beam aspect ratio between incident light and exiting light.

The present invention provides a light source apparatus including a plurality of light sources and a first beam profile transforming unit comprising a prism sheet having a plurality of mutually parallel fine elongated prisms on one surface thereof. The other surface of the prism sheet is a smooth flat surface. The first beam profile transforming unit is disposed at a side of the light source apparatus closer to the light sources so that light from the light sources is incident on the prism sheet at a predetermined angle. The light source apparatus further includes a second beam profile transforming unit comprising a prism sheet having a plurality of mutually parallel fine elongated prisms on one surface thereof. The other surface of the prism sheet is a smooth flat surface. The second beam profile transforming unit is provided next to the first beam profile transforming unit so that intermediate exiting light from the first beam profile transforming unit is incident on the second beam profile transforming unit and emitted therefrom as final exiting light. The second beam profile transforming unit is disposed so that the length direction of the prisms of the first beam profile transforming unit and the length direction of the prisms of the second beam profile transforming unit are perpendicular to each other as viewed from the incidence direction of light from the light sources.

According to the above-described light source apparatus, the prism sheets are arranged in first and second stages as first and second beam profile transforming units such that their respective prism rows extend perpendicular to each other. With this arrangement, it is possible to prevent the change in beam aspect ratio between incident light and exiting light and hence possible to allow the exiting light to have the same beam aspect ratio as that of the incident light.

The above-described light source apparatus may be arranged as follows. The first beam profile transforming unit comprises two prism sheets that are a first prism sheet and a second prism sheet provided side by side with the first prism sheet. The two prism sheets are disposed so that intermediate exiting light from each of the two prism sheets is incident on the second beam profile transforming unit at a predetermined angle. The light sources include a plurality of light sources that are disposed at the entrance surface side of each of the two prism sheets so that light from the light sources are incident on the associated prism sheet at a predetermined angle, whereby the first prism sheet synthesizes and outputs first exiting light and the second prism sheet synthesizes and outputs second exiting light. The intermediate exiting light comprises the first exiting light and the second exiting light. The two prism sheets are arranged so that the intermediate exiting light is applied to the entrance surface side of the second beam profile transforming unit, where the first exiting light and the second exiting light are combined together into third exiting light and output as final exiting light.

Further, the light source apparatus may be arranged as follows. The light sources are color light sources different in emission wavelength from each other, and exiting lights from the exit surface side of the second beam profile transforming unit are color-mixed light.

The color light sources may include red, green and blue color light sources.

The light source apparatus may be arranged as follows. The prisms of the prism sheet constituting each of the first and second beam profile transforming units each have a sectional shape of an isosceles triangle. The light source apparatus is arranged to satisfy the relationship of $\alpha \geq \beta$, where $\alpha$ denotes an angle between the base and oblique side of the isosceles triangle, and $\beta$ denotes an angle between the base of the isosceles triangle and a light beam passing between the base and oblique side of the isosceles triangle.

Conventional light source apparatus arranged as stated above have the problem that as the angle $\beta$ of a light beam incident on prism inclined surfaces decreases, the utilization efficiency of incident light is improved, but on the other hand the change in beam aspect ratio between incident light and exiting light increases. The above-described arrangement of the present invention makes it possible to readily solve the problem of change in beam aspect ratio between incident light and exiting light. It is also possible to improve the utilization efficiency of incident light and to solve the problem of expanded deformation of exiting light beam profile simultaneously.

In addition, the present invention provides a light source apparatus including a plurality of light sources and a first beam profile transforming unit comprising a prism sheet having a plurality of mutually parallel fine elongated prisms on one surface thereof. The other surface of the prism sheet is a smooth flat surface. The first beam profile transforming unit is disposed at a side of the light source apparatus closer to the light sources so that lights from the light sources are incident on the prism sheet at a predetermined angle. The light source apparatus further includes a second beam profile transforming unit comprising a prism sheet having a plurality of mutually parallel fine elongated prisms on one surface thereof. The other surface of the prism sheet is a smooth flat surface. The second beam profile transforming unit is provided next to the first beam profile transforming unit so that intermediate exiting light from the first beam profile transforming unit is incident on the second beam profile transforming unit and emitted therefrom as final exiting light. The second beam profile transforming unit is disposed so that the beam expanding direction at the first beam profile transforming unit and that at the second beam profile transforming unit are different from each other, and the beam aspect ratio of incident light at the first beam profile transforming unit and the beam aspect ratio of the final exiting light at the second beam profile transforming unit are the same as each other.

In addition, the present invention also provides a light source apparatus including a plurality of light sources and a first light profile transforming unit comprising at least one prism sheet having a plurality of first linear prisms formed in parallel on a surface of the at least one prism sheet. The at least one prism sheet is positioned relative to the light sources such that the at least one prism sheet receives a light from at least one of the light sources and transforms the light passing therethrough. The light source apparatus further includes a second light profile transforming unit comprising a prism sheet having a plurality of second linear prisms formed in parallel on a surface of the prism sheet. The prism sheet is positioned relative to the at least one prism sheet such that it receives the light from the at least one prism sheet and reverse-transforms the light passing therethrough. The light from the at least one of the light sources enters the at least one prism sheet in a direction which intersects the first linear prisms at an incident angle acute with respect to an incident surface of the at least one prism sheet. The light coming out from the at least one prism sheet of the first light profile transforming unit enters the prism sheet of the light profile transforming unit in a direction which intersects the second linear prisms at an incident angle acute with respect to an incident surface of the prism sheet. The first linear prisms of the first light profile transforming unit are oriented perpendicular to the second linear prisms of the second light profile transforming unit as viewed from a direction in which the light from the at least one prism sheet of the first light profile transforming unit advances toward the prism sheet of the second light profile transforming unit.

The light may travel as follows. The light from the at least one of the light sources enters the at least one prism sheet of the first light profile transforming unit in a direction normal to a running direction of the first linear prisms. The light from the at least one prism sheet enters the prism sheet of the second first light profile transforming unit in a direction normal to a running direction of the second linear prisms.

Further, the light source apparatus may be arranged as follows. The first light profile transforming unit comprises two prism sheets each receiving a light from the at least one light source and the lights from the two prism sheets converge in the prism sheet of the second light profile transforming unit.

Thus, the present invention provides a light source apparatus that combines incident light from a plurality of light sources by using a plurality of prism sheets. The prism sheets are divided into a first stage and a second stage to constitute a first beam profile transforming unit and a second beam profile transforming unit, and these are arranged so that the length directions of their respective prisms are perpendicular to each other. Therefore, it is possible to prevent the change in beam aspect ratio between incident light and exiting light and hence possible to allow the exiting light to have the same beam aspect ratio as that of the incident light. Thus, the light source apparatus can be made less costly, reduced in both size and thickness and improved in light utilization efficiency.

DETAILED DESCRIPTION OF THE PREFERRED EMBODIMENTS

Embodiments of the present invention will be explained below in detail with reference to the accompanying drawings.

Figure 1:
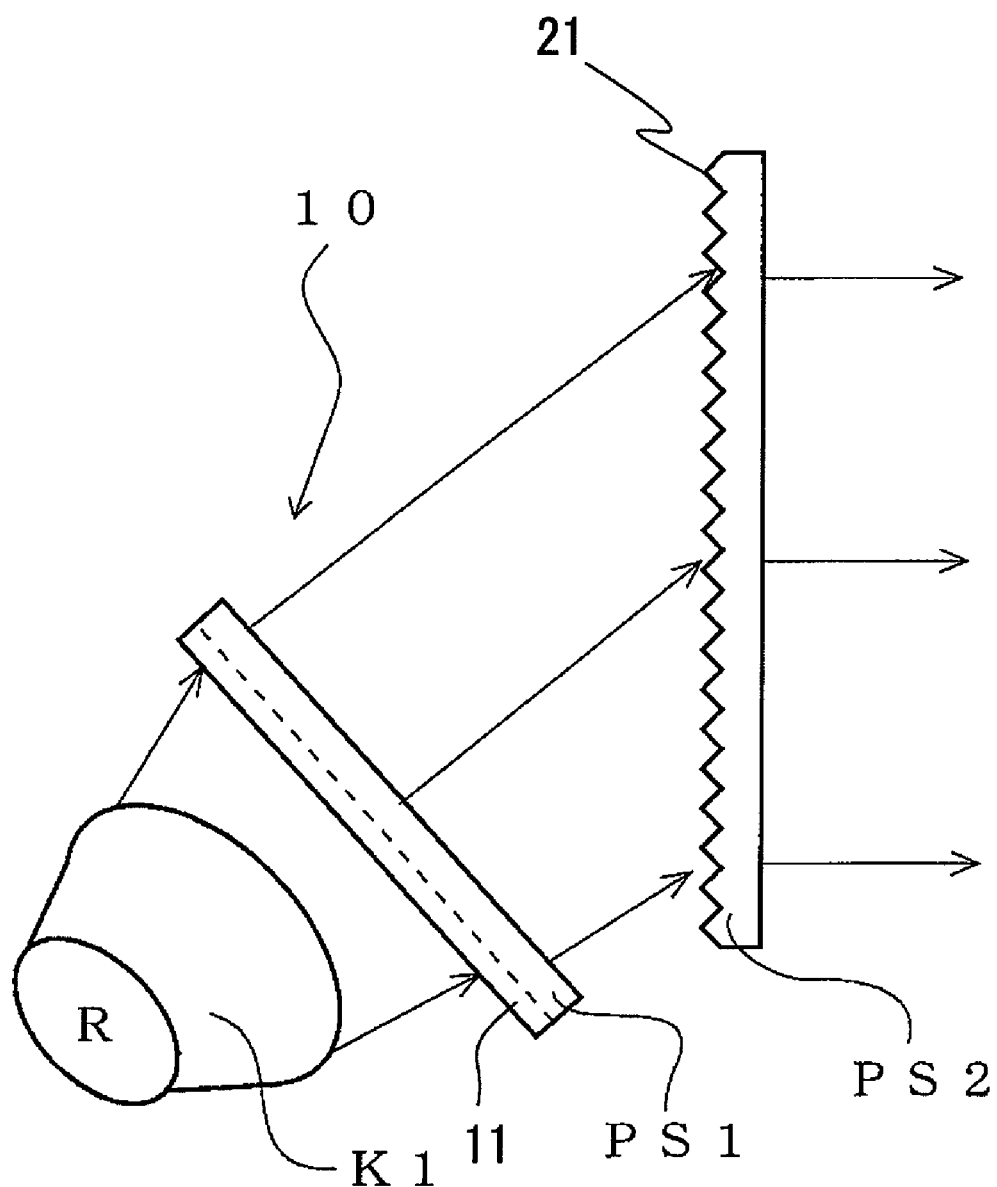
FIG. 1 is a perspective view of a light source apparatus according to a first embodiment of the present invention.
Figure 2:
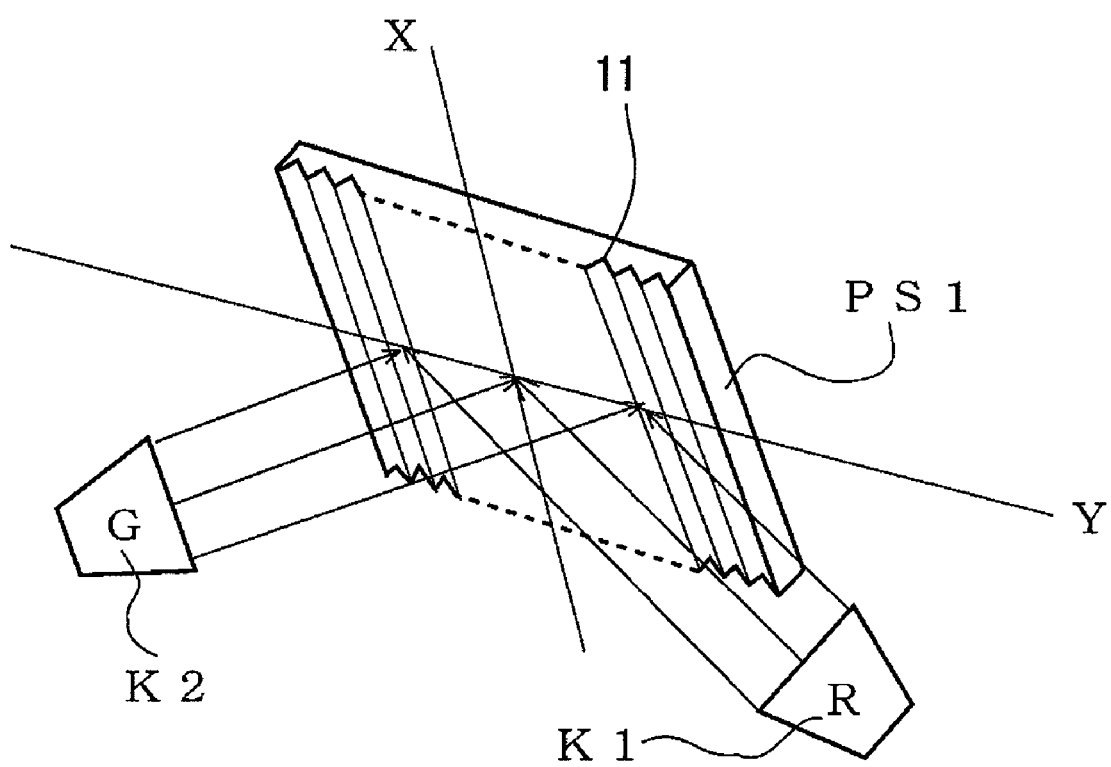
FIG. 2 is a perspective view showing the arrangement of two light sources relative to a prism sheet shown in FIG. 1.

FIGS. 1 to 4 show a light source apparatus according to a first embodiment of the present invention. FIG. 1 is a perspective view of the light source apparatus. FIG. 2 is a perspective view showing the arrangement of two light sources relative to a prism sheet shown in FIG. 1. As shown in FIGS. 1 and 2, a light source apparatus 10 has two prism sheets and two light sources K1 and K2. The prism sheets each have a plurality of mutually parallel fine elongated prisms 11 (21) on one surface thereof. The other surface of each prism sheet is a smooth flat surface. The two prism sheets constitute a first beam profile transforming unit PS1 and a second beam profile transforming unit PS2, respectively. The first and second beam profile transforming units PS1 and PS2 are arranged so that the length direction of the prisms 11 of the first beam profile transforming unit PS1 and the length direction of the prisms 21 of the second beam profile transforming unit PS2 are perpendicular to each other as viewed in the direction of incidence of light from each light source. In this embodiment, the prism sheets are disposed not parallel but at an angle to each other in a side view.

Each light source K has an LED (light-emitting diode) and a condenser lens, which are not shown in the figure. In the first embodiment, a red LED (hereinafter referred to as "R LED") is used as the light source K1, and a green LED (hereinafter referred to as "G LED") is used as the light source K2.

It should be noted that the light source K2 is not shown in FIG. 1 because it is disposed at a position symmetric to the light source K1 with respect to the first beam profile transforming unit PS1, i.e. at the other side of the light source K1 as viewed in FIG. 1, and therefore cannot be seen.

FIG. 2 is a perspective view showing the arrangement of two light sources relative to a prism sheet. That is, FIG. 2 shows the arrangement of the two light sources K1 and K2 as viewed from the entrance surface side of the first beam profile transforming unit PS1. More specifically, the second beam profile transforming unit PS2 is disposed so that the prisms 21 extend vertically in the same way as in the related conventional art, whereas the first beam profile transforming unit PS1 is disposed with the prisms 11 extending horizontally so that the length direction of the prisms 11 is perpendicular to the length direction of the prisms 21 of the second beam profile transforming unit PS2. Incident light from the two light sources K1 and K2 that are incident on the entrance surface side of the first beam profile transforming unit PS1 at a predetermined angle are combined together and output from the exit surface side of the first beam profile transforming unit PS1 as intermediate exiting light. Thereafter, the intermediate exiting light is incident on the entrance surface side of the second beam profile transforming unit PS2 and output from the exit surface side thereof as final exiting light.

Figure 10:
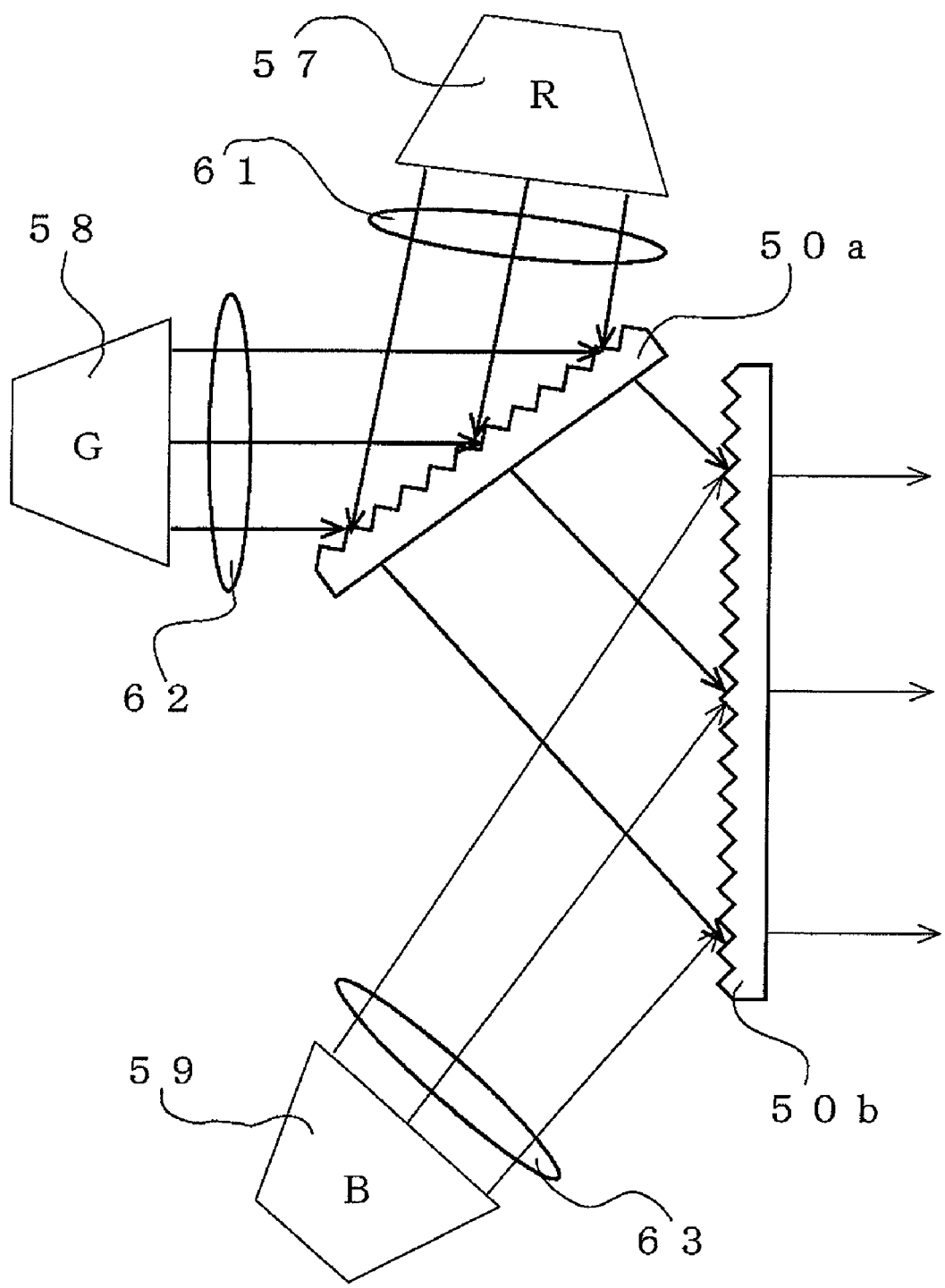
FIG. 10 is a schematic view showing the arrangement of a light source apparatus in a conventional color projector.
Figure 11:
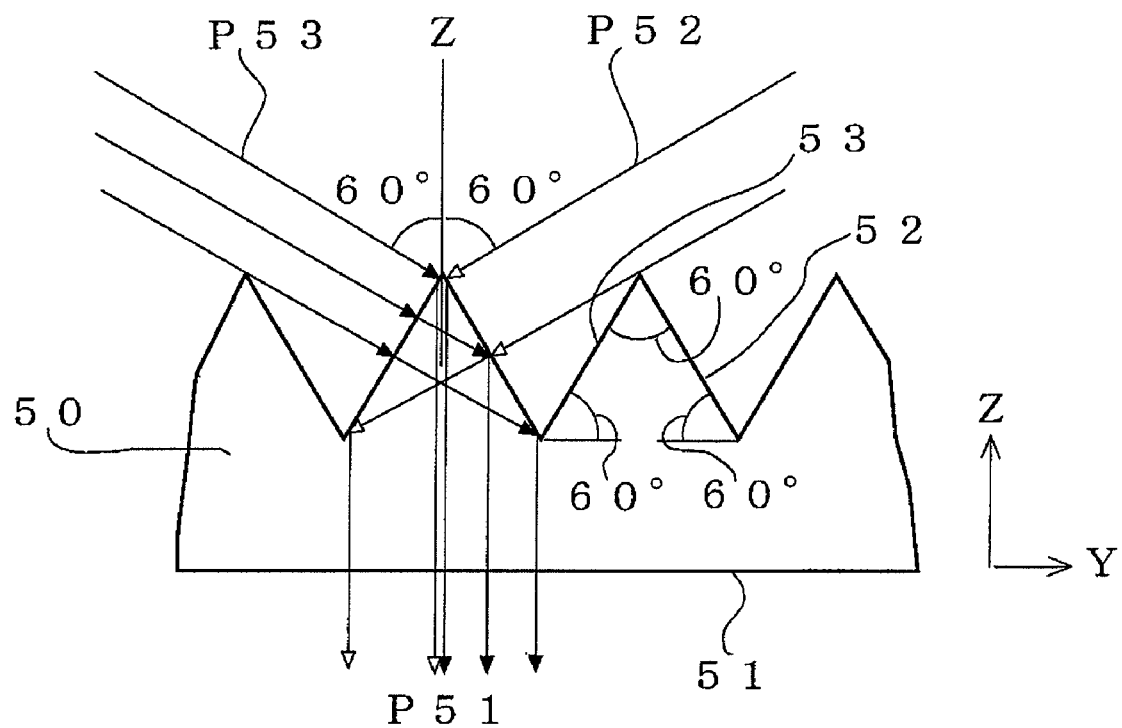
FIG. 11 is a fragmentary sectional view of a linear prism sheet shown in FIG. 10.

The arrangement of the light source apparatus 10 shown in FIG. 1 is basically the same as that of the conventional light source apparatus shown in FIG. 10, which comprises the linear prism sheets 50a and 50b and the R and G light sources 57 and 58. The light source apparatus 10 differs from the conventional apparatus in that the first beam profile transforming unit PS1 corresponding to the linear prism sheet 50a is disposed in a 90 degree rotated position so that the length direction of the prisms 11 of the first beam profile transforming unit PS1 is perpendicular to the length direction of the prisms 21 of the second beam profile transforming unit PS2. In association with the change of the positional relationship between the two prism sheets serving as the beam profile transforming units PS1 and PS2, the arrangement of the two light sources K1 and K2 is also changed by being rotated through 90 degrees so that the light sources K1 and K2 are spaced in a direction parallel to the alignment direction of the prisms 11 of the first beam profile transforming unit PS1 (i.e. the light sources K1 and K2 are disposed at the front and back sides, respectively, of the plane of FIG. 1). It should be noted that in FIG. 2 only the prisms at both ends on the entrance surface side of the first beam profile transforming unit PS1 are shown and the prisms in the central part thereof are indicated by the dotted lines for the sake of making the drawing readily understandable.

Figure 3:
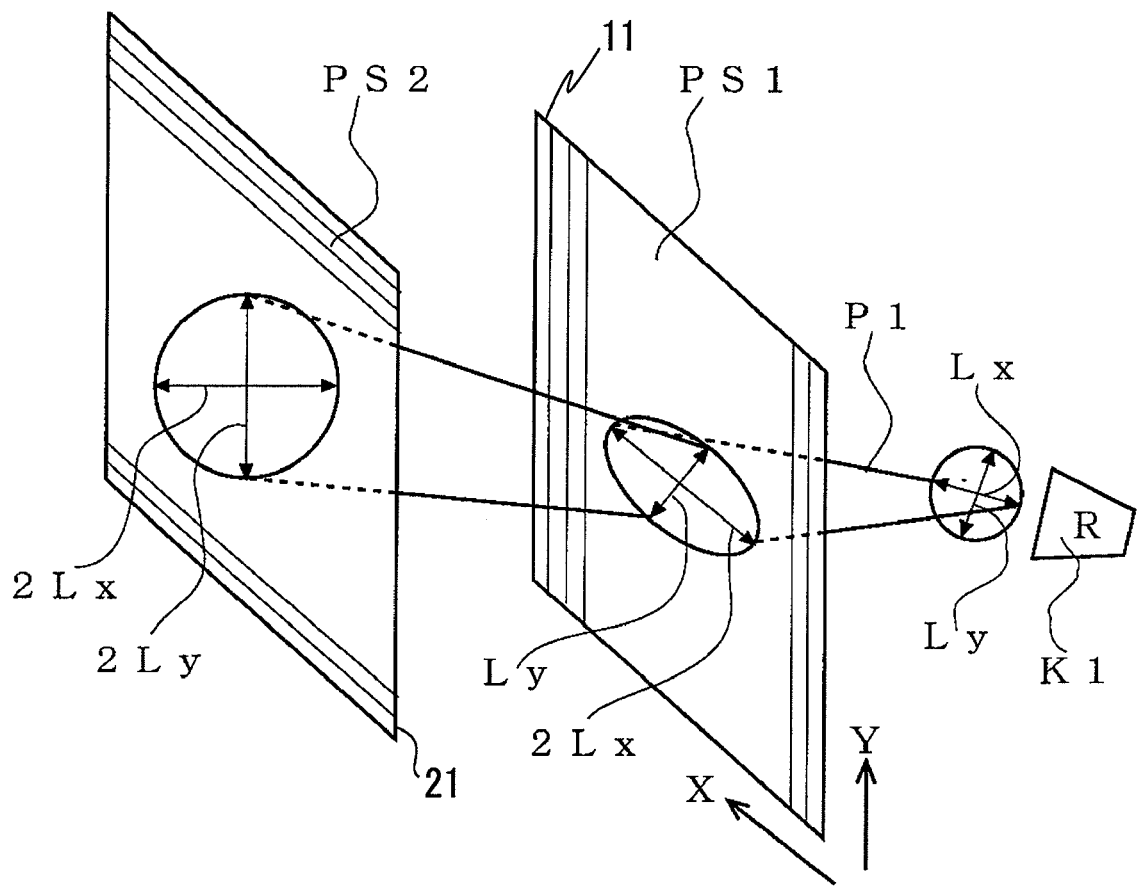
FIG. 3 is a schematic view showing an optical path along which light emitted from a light source travels passing successively through two prism sheets shown in FIG. 1.
Figure 14:
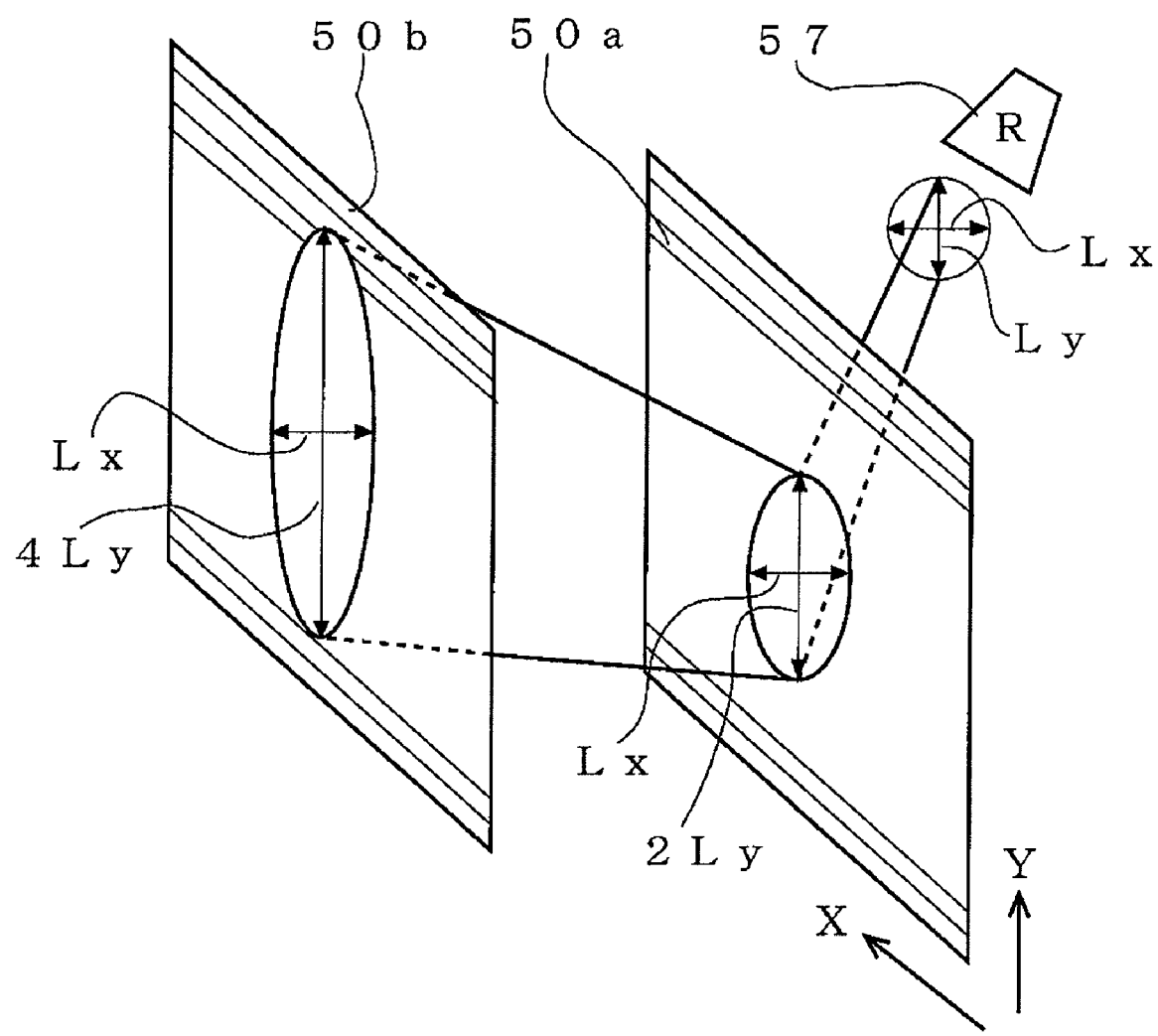
FIG. 14 is a schematic view showing an optical path along which light emitted from a light source travels passing successively through two linear prism sheets shown in FIG. 10.

FIG. 3 schematically shows an optical path along which light P1 from the light source K1 travels passing successively through the first and second beam profile transforming units PS1 and PS2 shown in FIG. 1. FIG. 3 shows the way in which the beam profile is expandedly deformed by each of the beam profile transforming units PS1 and PS2. It should be noted that the optical path diagram of FIG. 3 corresponds to the optical path diagram of FIG. 14 showing the related conventional art and is provided to compare differences therebetween. That is, in the present invention, as shown in FIG. 3, the direction in which the prisms 11 of the first beam profile transforming unit PS1 are aligned parallel to each other is parallel to the X axis, and the direction in which the prisms 21 of the second beam profile transforming unit PS2 are aligned parallel to each other is parallel to the Y axis. Thus, the alignment directions of the prisms 11 and 21 are perpendicular to each other. The beam width is expanded in a direction perpendicular to the length direction of the prisms, as has been stated above.

Let us explain the way in which light P1 emitted from the light source K1 shown in FIG. 3 is expandedly deformed by the first and second beam profile transforming unit PS1 and PS2 according to the above-described conditions. Let us consider that light P1 emitted from the light source K1 has a circular beam profile of $L_x$-$L_y$, where the beam width $L_x$ in the X axis direction and the beam width $L_y$ in the Y axis direction are equal to each other. First, when the light P1 is incident on the first beam profile transforming unit PS1, the beam width in the Y axis direction (length direction of the prisms 11) perpendicular to the alignment direction of the prisms 1 remains at $L_y$, whereas the beam width in the X axis direction parallel to the alignment direction of the prisms 11 is expanded to $2L_x$. Consequently, light (intermediate exiting light) exiting the first beam profile transforming unit PS1 has an elliptical beam profile of $2L_x$-$L_y$. Next, when the light of elliptical beam profile exiting the first beam profile transforming unit PS1 is incident directly on the second beam profile transforming unit PS2, the beam width in the X axis direction perpendicular to the alignment direction of the prisms 21 remains at $2L_x$, whereas the beam width in the Y axis direction (perpendicular to the length direction of the prisms 21) parallel to the alignment direction of the prisms 21 is expanded to $2L_y$. Accordingly, light (final exiting light) exiting the second beam profile transforming unit PS2 has a circular beam profile of $2L_x$-$2L_y$.

In a light source apparatus wherein two prism sheets are arranged so that the length directions of their respective prisms are parallel to each other as in the related conventional art shown in FIG. 14, light having passed successively through the two prism sheets has an extremely elliptical beam profile of $L_x$-$4L_y$, as has been stated above. In the light source apparatus of the present invention shown in FIG. 3, the two beam profile transforming units PS1 and PS2 are arranged so that the length directions of their respective prisms 11 and 21 are perpendicular to each other. With this arrangement, light having passed successively through the two beam profile transforming units PS1 and PS2 has a circular beam profile of $2L_x$-$2L_y$. Thus, the beam aspect ratio of light (final exiting light) exiting the second beam profile transforming unit PS2 is the same as that of the light incident on the first beam profile transforming unit PS1. This results from the fact that the beam expanding direction at the first beam profile transforming unit PS1 and that at the second beam profile transforming unit PS2 are made different from each other. In this embodiment, the above-described advantageous effect is obtained by adopting a structure having a second beam profile transforming unit arranged so that the length direction of prisms thereof is perpendicular to the length direction of the prisms of a first beam profile transforming unit.

Figure 4:
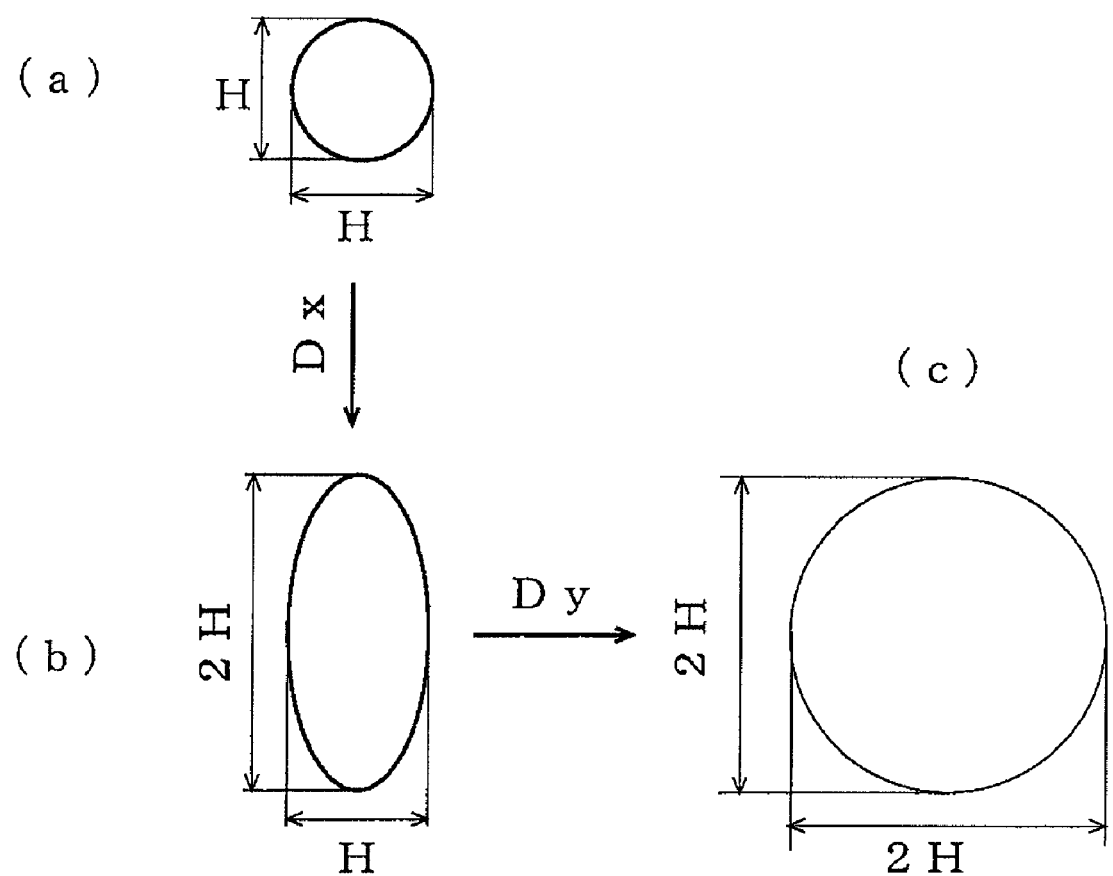
FIG. 4 is a plan view showing beam profiles expandedly deformed in FIG. 3.
Figure 13:
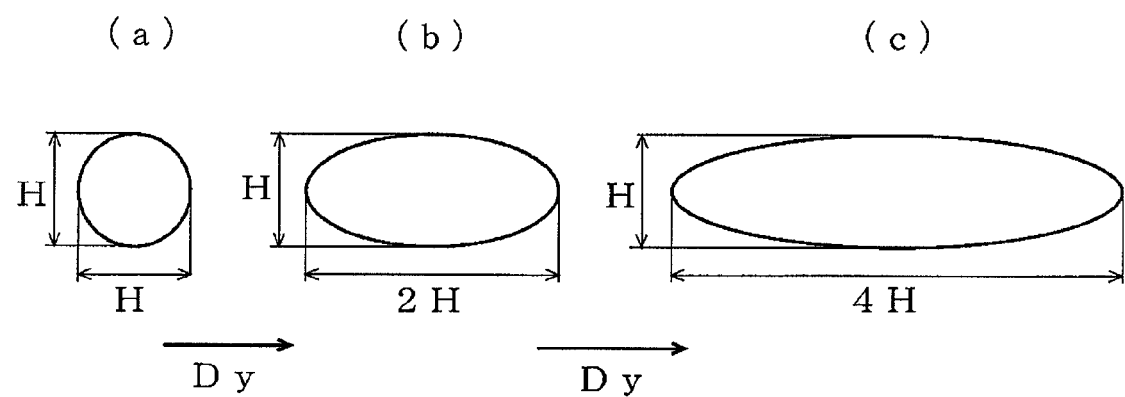
FIG. 13 is a plan view showing beam profiles expandedly deformed in FIG. 12.

FIG. 4 is a plan view showing beam profiles expandedly deformed in FIG. 3. The plan view of FIG. 4 corresponds to FIG. 13 showing beam profiles in the related conventional art and is provided to compare differences therebetween. Part (a) of FIG. 4 shows light P1 (incident on the first beam profile transforming unit) from the light source K1 that is a circular beam having a beam width H in both the X and Y axis directions. Part (b) of FIG. 4 shows the light P1 expanded double in the X axis direction by the first beam profile transforming unit PS1. That is, the light P1 is expandedly deformed into an elliptical beam (intermediate exiting light) having a width 2H in the X axis direction. Part (c) of FIG. 4 shows the beam profile of light (final exiting light) obtained when light exiting the first beam profile transforming unit PS1 is incident on and output from the second beam profile transforming unit PS2. The final exiting light is a circular beam having a beam width 2H in both the X and Y axis directions as a result of being expanded double in the Y axis direction. That is, the beam expanding direction is changed as follows: the beam expansion from part (a) to (b) of FIG. 4 is in the X axis direction $D_x$; and the beam expansion from part (b) to part (c) of FIG. 4 is in the Y axis direction $D_y$. With this arrangement, the beam aspect ratio of the incident light and that of the exiting light are allowed to be the same.

Figure 5:
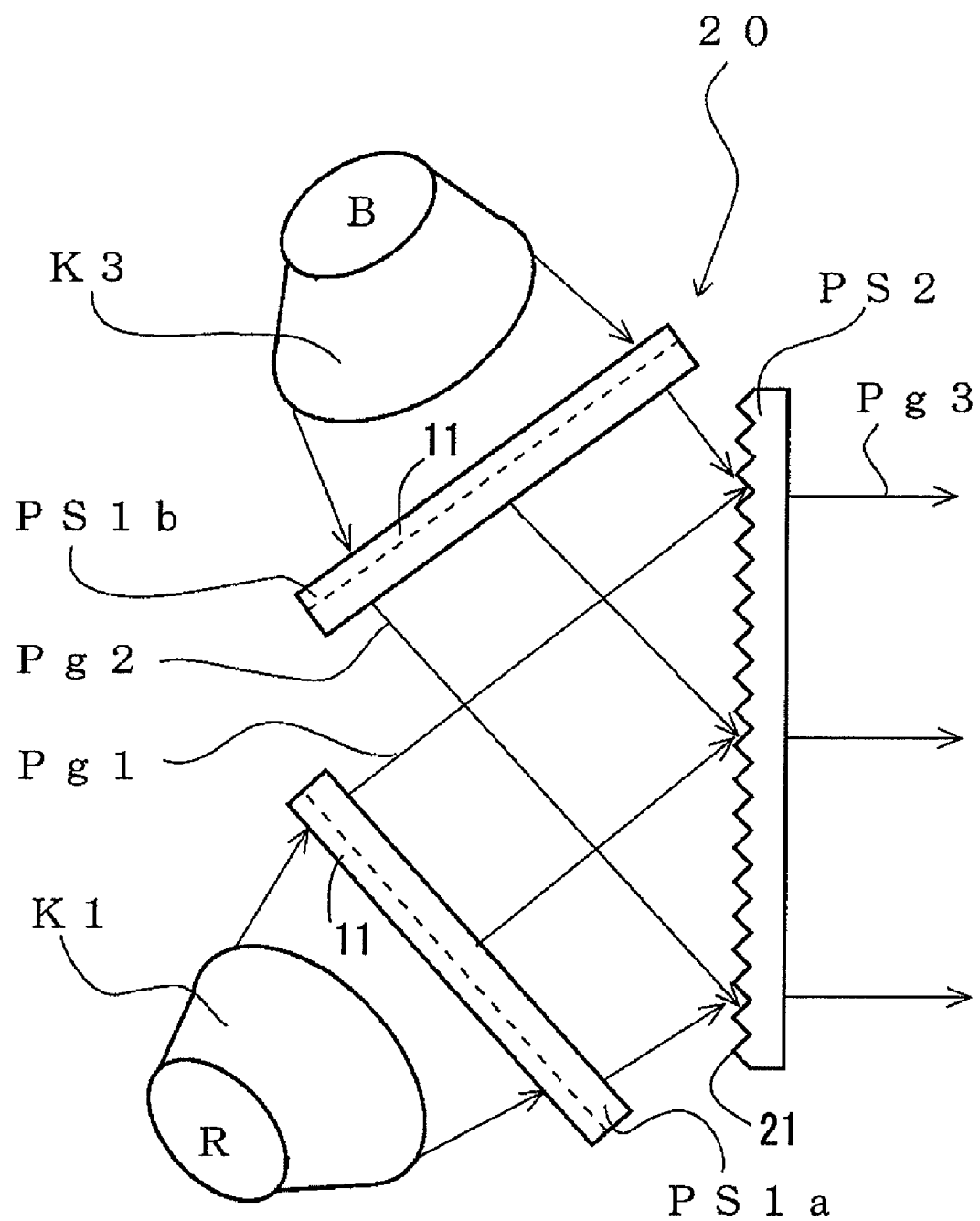
FIG. 5 is a perspective view of a light source apparatus according to a second embodiment of the present invention.

FIG. 5 is a perspective view of a light source apparatus 20 according to a second embodiment of the present invention. The basic structure of the light source apparatus 20 according to the second embodiment is the same as that of the light source apparatus 10 shown in FIG. 1. Therefore, the same constituent elements of the light source apparatus 20 as those of the light source apparatus 10 are denoted by the same reference numerals as used in FIG. 1, and redundant explanation is omitted.

The light source apparatus 20 in FIG. 5 differs from the light source apparatus 10 as follows. The first beam profile transforming unit PS1 comprises two prism sheets, i.e. a first prism sheet PS1*a* and a second prism sheet PS1*b* provided side by side with the first prism sheet PS1*a*. The two prism sheets PS1*a* and PS1*b* are arranged so that intermediate exiting light from each of them is incident on the second beam profile transforming unit PS2 at a predetermined angle. The first prism sheet PS1*a* and the second prism sheet PS1*b* are disposed so that the alignment direction of prism rows of each of them is perpendicular to the alignment direction of the prism rows of the second beam profile transforming unit PS2. A plurality of light sources are provided at the entrance surface side of each of the first and second prism sheets PS1*a* and PS1*b* so that light from each light source is incident on the associated prism sheet at a predetermined angle. First exiting light (intermediate exiting light) Pg1 and second exiting light (intermediate exiting light) Pg2 respectively synthesized by the first and second prism sheets PS1*a* and PS1*b* are incident on the entrance surface side of the second beam profile transforming unit PS2 and output from the exit surface side thereof as third exiting light (final exiting light) Pg3.

In FIG. 5, the first prism sheet PS1*a* corresponds to the first beam profile transforming unit PS1 in FIG. 1. Two light sources K1 and K2 are disposed at the entrance surface side of the first prism sheet PS1*a* with a predetermined angle therebetween in the same way as shown in FIG. 2. The optical operation performed by the first prism sheet PS1*a* and the second beam profile transforming unit PS2 is the same as the optical operation by the first beam profile transforming unit PS1 and the second beam profile transforming unit PS2 in the embodiment shown in FIG. 1. The second prism sheet PS1*b* is disposed at a position symmetric to the first prism sheet PS1*a* with respect to the second beam profile transforming unit PS2 with a predetermined angle therebetween. The second prism sheet PS1*b* is also provided two light sources K3 and K4 in the same positional relationship as that of the light sources shown in FIG. 2.

The following is an explanation of the optical operation of the light source apparatus 20. Combining of light from four light sources will be explained below, by way of example. Let us assume that the light sources K1 and K2 associated with the first prism sheet PS1*a* are an R light source and a G light source, respectively, and the light sources K3 and K4 associated with the second prism sheet PS1*b* are a B light source and a G light source, respectively. On this assumption, R light from the light source K1 and G light from the light source K2 are combined together by the first prism sheet PS1*a* and output as first exiting light Pg1. B light from the light source K3 and G light from the light source K4 are combined together by the second prism sheet PS1*b* and output as second exiting light Pg2. The two exiting light Pg1 and Pg2 are incident on the second beam profile transforming unit PS2, thereby being combined together and output as third exiting light Pg3.

In the above-described optical operation, the first exiting light Pg1 is mixed light of R light and G light, and the second exiting light Pg2 is mixed light of B light and G light. Therefore, the third exiting light Pg3 is white light formed by mixing of R, G, B and G light. In this regard, two G LED light sources are used in view of the fact that a G LED emits a relatively small amount of light. Accordingly, it is possible to obtain white light with a good balance of R, G and B light.

Although in the above-described embodiment the combining of light from four light sources has been described with regard to the mixing of R, G, B and G light, it should be noted that the present invention is not necessarily limited thereto. If three of the four light sources are R, G and B LEDs and the remaining one light source is a blue YAG LED, it is possible to obtain white light superior in color rendering properties. If a G LED capable of emitting a sufficiently large amount of light is available, the light source K4, which is a G LED, may be omitted to obtain white light by mixing of light from the remaining three light sources. In all these light source apparatus, the first beam profile transforming unit PS1 and the second beam profile transforming unit PS2 are arranged so that their respective prism rows extend perpendicular to each other. Therefore, the beam aspect ratio of the light incident on the first beam profile transforming unit PS1 and that of the final exiting light are the same. That is, light having a circular beam profile can be obtained as the final exiting light.

Figure 6:
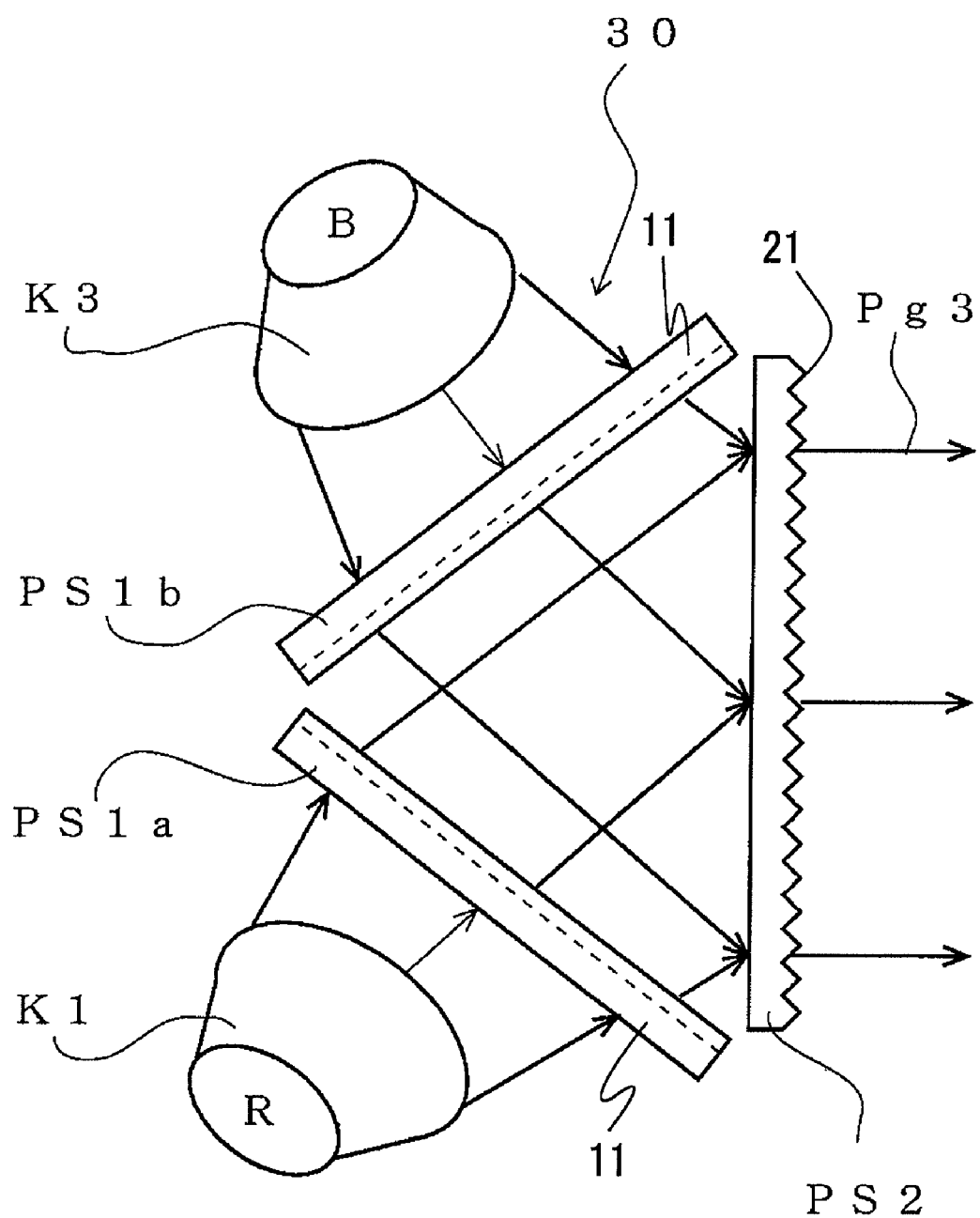
FIG. 6 is a perspective view of a light source apparatus according to a third embodiment of the present invention.

FIG. 6 is a perspective view of a light source apparatus 30 according to a third embodiment of the present invention. The basic structure of the light source apparatus 30 according to the third embodiment is the same as that of the light source apparatus 20 shown in FIG. 5. Therefore, the same constituent elements of the light source apparatus 30 as those of the light source apparatus 20 are denoted by the same reference numerals as used in FIG. 5, and redundant explanation is omitted. The light source apparatus 30 in FIG. 6 differs from the light source apparatus 20 as follows. The first and second prism sheets PS1a and PS1b and the second beam profile transforming unit PS2 are all arranged so that light is incident on the plane surface side and exits from the prism surface side. In this arrangement also, exiting light of circular beam profile having the same beam aspect ratio as that of incident light can be obtained from the exit surface of the second beam profile transforming unit PS2 by appropriately setting the refractive index of each prism sheet, the prism apex angle and the incidence angle of incident light. The arrangement of the present invention in which the first beam profile transforming unit PS1 and the second beam profile transforming unit PS2 are disposed so that their respective prisms extend perpendicular to each other, as stated above, effectively works regardless of whether the light beam is incident on the prism surface of each prism sheet or on the smooth flat surface thereof.

Figure 7:
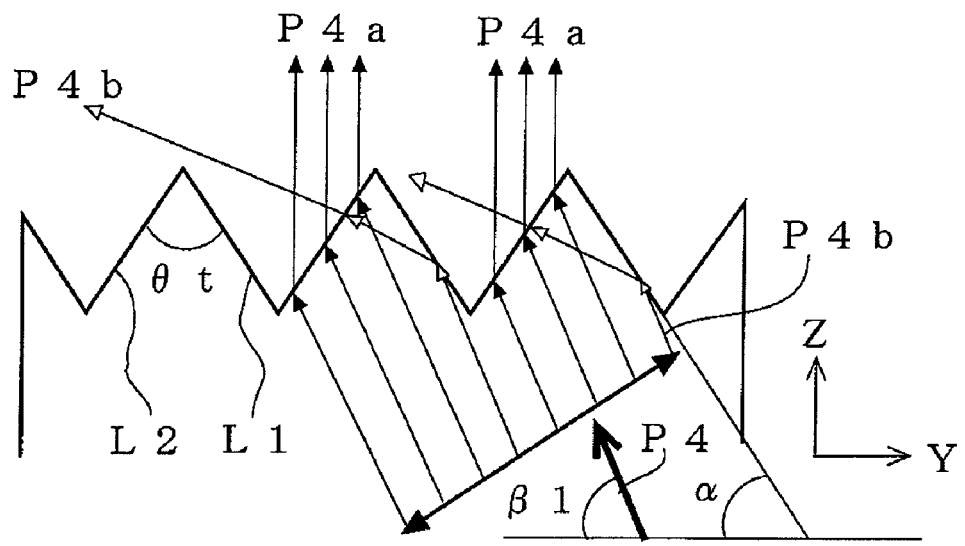
FIG. 7 is a sectional view showing the relationship between the incidence angle of incident light on the prism surface and the angle of the prism inclined surfaces in the present invention.
Figure 8:
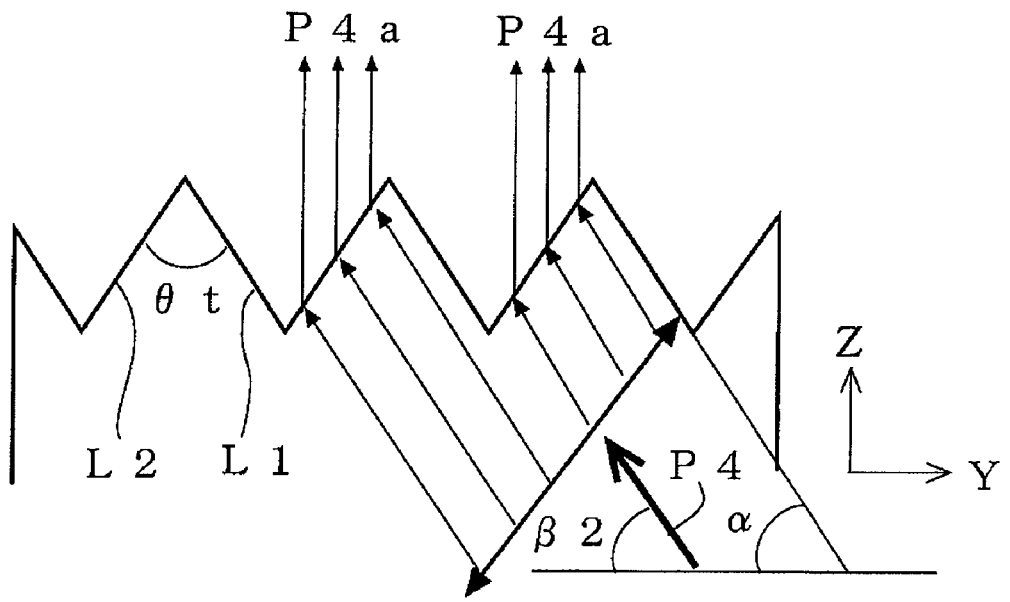
FIG. 8 is a sectional view showing the relationship between the incidence angle of incident light on the prism surface and the angle of the prism inclined surfaces in the present invention.
Figure 9:
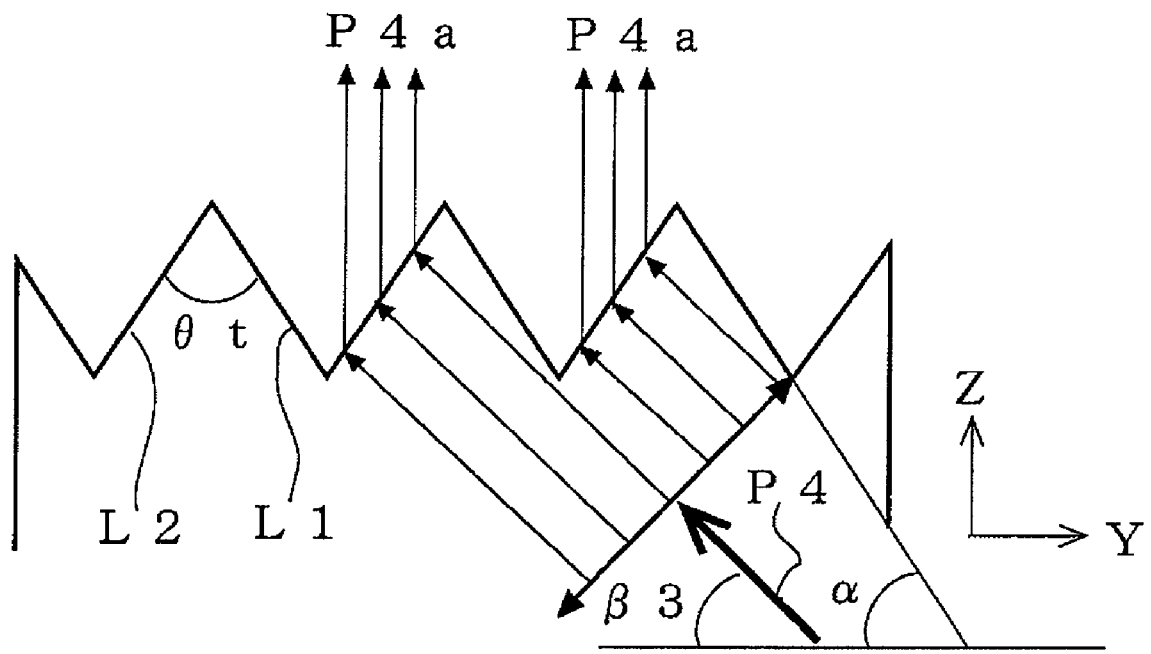
FIG. 9 is a sectional view showing the relationship between the incidence angle of incident light on the prism surface and the angle of the prism inclined surfaces in the present invention.

The following is an explanation of the relationship between the incidence angle of incident light on the prism inclined surfaces and the prism angle of the prism inclined surfaces in the present invention. FIGS. 7, 8 and 9 are sectional views each showing the relationship between the incidence angle of incident light on the prism inclined surfaces and the prism angle of the prism inclined surfaces. FIGS. 7, 8 and 9 each show a Y-Z section of a prism sheet having a prism apex angle $\theta_r$, by way of example, the Y-Z plane being perpendicular to the prism rows of the prism sheet, in a case where incident light is applied to the plane surface side of the prism sheet. In each figure, $\alpha$ denotes the prism angle between the base and oblique side of an isosceles triangle constituting each prism of the prism sheet PS1 (i.e. the angle between the plane of the Y axis and one prism inclined surface), and $\beta$ denotes the angle between the base of the isosceles triangle constituting each prism of the prism sheet PS1 and a light beam (beam incident on the prism inclined surfaces) passing between the base and oblique side of the triangle. Prism sheets as beam profile transforming units shown in FIGS. 7, 8 and 9 all have the same prism apex angle $\theta_r$, and the refractive index of each prism sheet is adjusted so that exiting light is emitted directly upward.

FIG. 7 shows the relationship of $\beta > \alpha$, i.e. a case where the incidence angle $\beta 1$ of incident light P4 is larger than the prism angle $\alpha$. In FIG. 7, the incident light P4 is leftward oblique incident light, and light rays incident on the leftwardly downwardly inclined prism inclined surfaces L2 of the prism sheet PS1 are allowed to exit as effective light. Accordingly, the prism inclined surfaces L2 are effective prism inclined surfaces, and the rightwardly downwardly inclined prism inclined surfaces L1 are non-effective prism inclined surfaces (in a case where the incident light P4 is rightward oblique incident light, the prism inclined surfaces L1 are effective prism inclined surfaces, and the prism inclined surfaces L2 are non-effective prism inclined surfaces).

On the above-described assumption, when incident light P4 having a certain width is incident on the prism sheet PS1 from the bottom side thereof, the greater part of rays (shown by the black arrows) of the incident light P4 pass through the prism inclined surfaces L2, which are effective prism inclined surfaces, to exit directly upward as effective light P4a. However, some rays (shown by the white arrows) of the incident light P4 impinge on and are reflected by the prism inclined surfaces L1, which are non-effective prism inclined surfaces. After traveling through the prisms, the reflected rays pass through the prism inclined surfaces L2 to exit in a direction that is not directly upward as non-effective light P4b.

More specifically, the rays of effective light P4a, which are shown by the black arrows, impinge on the prism inclined surfaces L2 at an angle smaller than the critical angle and are therefore transmitted therethrough with refraction. On the other hand, the rays of non-effective light P4b, which are shown by the white arrows, impinge on the prism inclined surfaces L1 at an angle not smaller than the critical angle and are therefore reflected thereby. The rays of non-effective light P4b reflected by the prism inclined surfaces L1 travel through the prisms and thereafter impinge on the prism inclined surfaces L2 at an angle smaller than the critical angle. Therefore, the rays are transmitted through the prism inclined surfaces L2 with refraction to exit in a direction that is not directly upward. That is, in the case of the relationship of $\beta > \alpha$ shown in FIG. 7, the utilization efficiency of incident light decreases by an amount corresponding to an amount of incident light P4 lost as the non-effective light P4b by impinging on the prism inclined surfaces L1, which are non-effective prism inclined surfaces.

FIG. 8 shows the relationship of $\beta = \alpha$, i.e. a case where the incidence angle $\beta 2$ of incident light P4 is the same as the prism angle $\alpha$. On the assumption explained in connection with FIG. 7, when incident light P4 having a certain width is incident on the prism sheet PS1 from the bottom side thereof, all the rays (shown by the black arrows) of the incident light P4 pass through the prism inclined surfaces L2, which are effective prism inclined surfaces, to exit as effective light P4a. There occurs no non-effective light P4b that impinges on and is reflected by the prism inclined surfaces L1, which are non-effective prism inclined surfaces.

FIG. 9 shows the relationship of $\beta<\alpha$, i.e. a case where the incidence angle $\beta 3$ of incident light P4 is smaller than the prism angle $\alpha$. On the assumption explained in connection with FIG. 7, when incident light P4 having a certain width is incident on the prism sheet PS1 from the bottom side thereof, all the rays (shown by the black arrows) of the incident light P4 pass through the prism inclined surfaces L2, which are effective prism inclined surfaces, to exit as effective light P4a. There occurs no non-effective light P4b that impinges on and is reflected by the prism inclined surfaces L1, which are non-effective prism inclined surfaces.

The relationship between the incidence angle $\beta$ of incident light on the prism surface of the prism sheet and the prism angle $\alpha$ of the prism inclined surfaces is as stated above. That is, with the relationship of $\beta>\alpha$ shown in FIG. 7, a part of the incident light P4 becomes non-effective light P4b, resulting in a reduction in utilization efficiency of incident light. With the relationship of $\beta=\alpha$ shown in FIG. 8 and the relationship of $\beta<\alpha$ shown in FIG. 9, non-effective light P4b does not occur, and so all the rays of incident light P4 become effective light P4a. Therefore, the incident light utilization efficiency is improved. Thus, it will be understood that it is preferable to set $\beta\leq\alpha$ for the relationship between the incidence angle $\beta$ of incident light on the prism surface of the prism sheet and the prism angle $\alpha$ of the prism inclined surfaces.

Figure 12:
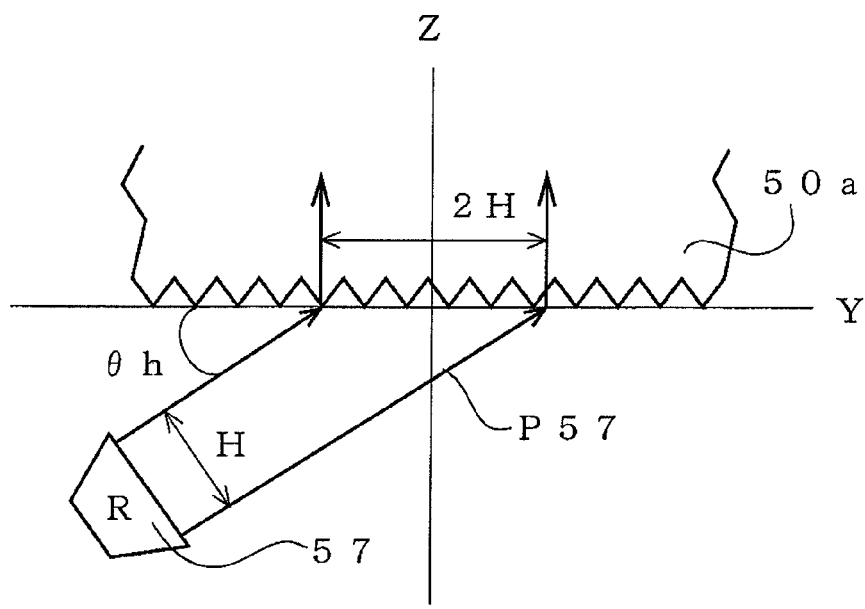
FIG. 12 is a side view showing expansion of a light beam when incident light is incident on an entrance surface of a linear prism sheet shown in FIG. 10.

However, if the relationship between the incidence angle $\beta$ of incident light and the prism angle $\alpha$ of the prism inclined surfaces is set to $\beta\leq\alpha$, although the utilization efficiency of incident light is improved, the expanded deformation of the beam profile increases because the expansion of the beam width increases as the incidence angle $\beta$ of incident light on the entrance surface of the prism sheet decreases, as stated in connection with FIG. 12. In other words, the relationship between the incidence angle $\beta$ of incident light and the prism angle $\alpha$ of the prism inclined surfaces has two conflicting facts: the fact that the relationship of $\beta\leq\alpha$ is preferable from the viewpoint of the utilization efficiency of incident light; and the fact that the relationship of $\beta>\alpha$ is preferable from the viewpoint of improving the expanded deformation of the beam profile.

Accordingly, it has been necessary in the conventional light source apparatus either to choose the relationship of $\beta>\alpha$ to reduce the expanded deformation of the beam profile at the sacrifice of the utilization efficiency of incident light or to choose the relationship of $\beta\leq\alpha$ to improve the utilization efficiency of incident light and moreover to devise a scheme to improve the expanded deformation of the beam profile by using an aspherical lens or the like. Thus, the conventional technique has problems from the viewpoint of reducing the size of the apparatus and efficiently utilizing light rays.

In contrast, the light source apparatus of the present invention has prism sheets arranged so that their respective prisms extend perpendicular to each other. Therefore, if the relationship between the incidence angle $\beta$ of light and the prism angle $\alpha$ is set to $\beta\leq\alpha$ in addition to the above-described prism sheet arrangement, it is possible not only to obtain an advantage that the light utilization efficiency is improved and the problem of expanded deformation of the beam profile is solved but also to offer a peculiar advantage that exiting light of circular beam profile having the same beam aspect ratio as that of incident light can be obtained even more efficiently. Although incident light applied to the prism sheet from the plane surface side thereof has been considered in regard to FIGS. 7 to 9, it should be noted that the relationship of $\beta\leq\alpha$ in the present invention is also effective for incident light applied to the prism sheet from the prism surface side thereof.

As has been stated above, the present invention enables incident light from a plurality of light sources to be efficiently combined together by an optical system formed thin from prism sheets and also makes it possible to obtain exiting light of circular beam profile having the same beam aspect ratio as that of the incident light. Accordingly, it is possible to provide a light source apparatus that is small and thin in shape and optically superior in light combining performance. The present invention has a wide application range and is usable not only as general illumination apparatus but also as light sources for projectors and backlight units for liquid crystal display apparatus.

The invention claimed is:

1. A light source apparatus comprising:
    a plurality of light sources;
    a first beam profile transforming unit comprising a prism sheet having two opposite sides, a plurality of mutually parallel fine elongated prisms formed on one side of the two opposite sides, an other side of the two opposite sides being a smooth flat surface, the first beam profile transforming unit being disposed at a side of the light source apparatus closer to the light sources that are disposed to face the first beam profile transforming unit to emit light into the first beam profile transforming unit;
    a second beam profile transforming unit comprising a prism sheet having two opposite sides, a plurality of mutually parallel fine elongated prisms formed on one side of the two opposite sides to receive light that is passed through the two opposite sides of the prism sheet included in the first beam profile transforming unit; and
    the first beam profile transforming unit obliquely facing the second beam profile transforming unit, and the plurality of mutually parallel fine elongated prisms of the first beam profile transforming unit being configured to intersect the plurality of mutually parallel fine elongated prisms of the second light profile transforming unit as viewed from an incidence direction of light from the light sources.

2. The light source apparatus of claim 1, wherein the first beam profile transforming unit comprises two prism sheets that are a first prism sheet and a second prism sheet provided side by side with each other, the two prism sheets are disposed to face at least one of the light sources, respectively, and the first prism sheet and the second prism sheet of the first beam profile transforming unit obliquely face the second beam profile transforming unit, respectively, and the plurality of mutually parallel fine elongated prisms of the first and the second prisms of the first beam profile transforming unit are configured to intersect the plurality of mutually parallel fine elongated prisms of the second light profile transforming unit, respectively.

3. The light source apparatus of claim 1, wherein the plurality of light sources include light sources that are different from each other in emission wavelength, so that light exiting from the second beam profile transforming unit are color-mixed.

4. The light source apparatus of claim 3, wherein the plurality of light sources include red, green, and blue color light sources.

5. The light source apparatus of claim 1, wherein each of the plurality of mutually parallel fine elongated prisms of the prism sheets included in the first and second beam profile transforming units has a sectional shape of an isosceles triangle, the light source apparatus being arranged to satisfy a relationship of $\alpha\geq\beta$, where $\alpha$ denotes an angle between a base and oblique surface of the isosceles triangle, and $\beta$ denotes an angle between the base of the isosceles triangle and a light beam passing between the base and oblique surface of the isosceles triangle.

6. A light source apparatus comprising:

a plurality of light sources;

a first beam profile transforming unit comprising a prism sheet having two opposite sides, a plurality of mutually parallel fine elongated prisms formed on one side of the two opposite sides, an other side of the two opposite sides being a smooth flat surface, the first beam profile transforming unit being disposed at a side of the light source apparatus closer to the light sources that are disposed to face the first beam profile transforming unit to emit light into the first beam profile transforming unit;

a second beam profile transforming unit comprising a prism sheet having two opposite sides, a plurality of mutually parallel fine elongated prisms formed on one side of the two opposite sides to receive light that are passed through the two opposite sides of the prism sheet included in the first beam profile transforming unit; and;

the first beam profile transforming unit obliquely facing the second beam profile transforming unit, and the plurality of mutually parallel fine elongated prisms of the first beam profile transforming unit being configured to intersect the plurality of mutually parallel fine elongated prisms of the second light profile transforming unit as viewed from an incidence direction of light from the light sources so that a beam expanding direction at the first beam profile transforming unit and that at the second beam profile transforming unit are different from each other, and a beam aspect ratio of incident lights at the first beam profile transforming unit and a beam aspect ratio of the first exiting lights at the second beam profile transforming unit are same as each other.

7. A light source apparatus comprising:

a plurality of light sources;

a first beam profile transforming unit comprising at least one prism sheet having a plurality of first linear prisms formed in parallel on a surface of the at least one prism sheet, the at least one prism sheet being positioned relative to the light sources such that the at least one prism sheet receives light from at least one of the light sources and transforms the light passing therethrough; and a second light profile transforming unit comprising a prism sheet having a plurality of second linear prisms formed in parallel on a surface of the prism sheet;

the first beam profile transforming unit obliquely facing the second beam profile transforming unit, and the plurality of mutually parallel fine elongated prisms of the first beam profile transforming unit being configured to intersect the plurality of mutually parallel fine elongated prisms of the second light profile transforming unit;

wherein the light from the at least one of the light sources enters the at least one prism sheet of the first beam profile transforming unit in a direction which intersects the first linear prisms at an incident angle acute with respect to incident surfaces of the first linear prisms;

the light coming out from the first light profile transforming unit enters the second light profile transforming unit in a direction which intersects the second linear prisms at an incident angle acute with respect to incident surfaces of the second linear prisms; and, wherein the first linear prisms of the first light profile transforming unit are oriented to intersect the second linear prisms of the second light profile transforming unit as viewed from an incidence direction of light from the light sources in which the light from the at least one prism sheet of the first light profile transforming unit advances toward the prism sheet of the second light profile transforming unit.

8. The light source apparatus of claim 7, wherein the light from the light sources enters the at least one prism sheet of the first light profile transforming unit in a direction normal to a running direction of the first linear prisms, and the light from the at least one prism sheet enters the prism sheet of the second light profile transforming unit in a direction normal to a running direction of the second linear prisms.

9. The light source apparatus of claim 7, wherein the first light profile transforming unit comprises two prism sheets each receiving light from at least one of the light sources and the lights from the two prism sheets converge in the prism sheet of the second light profile transforming unit.

* * * * *